J. B. ASH.
Clod-Crusher.
No. 29,659.
Patented Aug. 21, 1860.
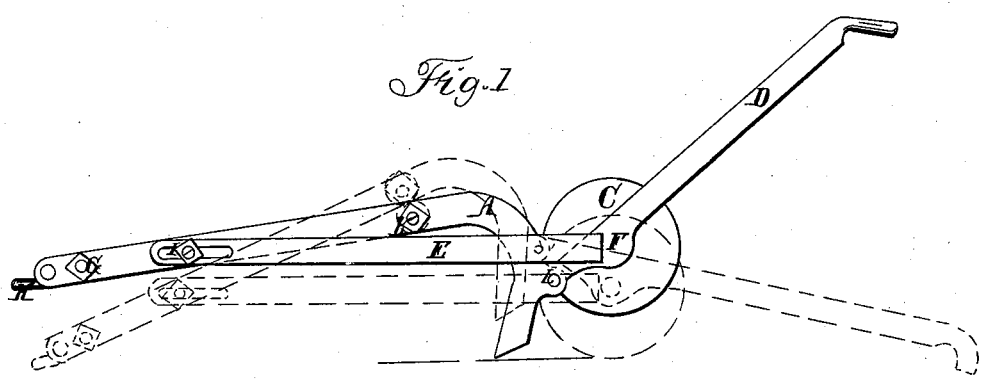
Fig. 1
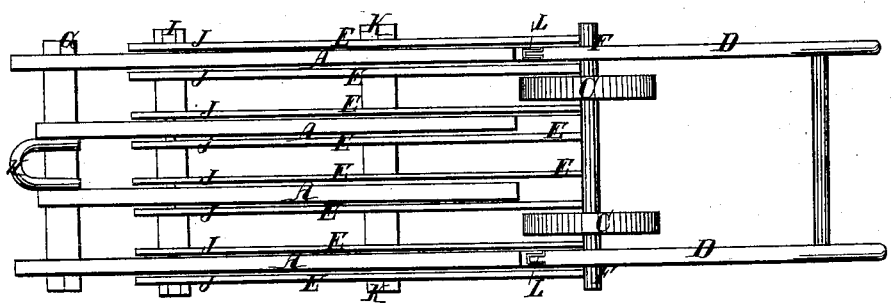
Witnesses:
Goodwin Y Atlee
G. F. G. Dietrich
Inventor:
Munn & Co
attorneys for
J. B. Ash

UNITED STATES PATENT OFFICE.

JACOB B. ASH, OF ELKTON, MARYLAND.

IMPROVEMENT IN GRUBBING-MACHINES.

Specification forming part of Letters Patent No. 29,659, dated August 21, 1860.

*To all whom it may concern:*

Be it known that I, JACOB B. ASH, of Elkton, in the county of Cecil and State of Maryland, have invented a new and useful Improvement in Machines for Grubbing Up Roots, &c.; and I do hereby declare that the following is a full, clear, and exact description of the same, reference being had to the accompanying drawings, forming a part of this specification, in which—

Figure 1 is a side view, representing two positions of the implement, (one in black, the other in red, lines;) and Fig. 2, a top view.

Similar letters of reference in each of the two figures indicate corresponding parts.

The nature of my invention consists in the combination and relative arrangement of hooks A, slots B, rollers C, and hand-levers D, for the purposes hereinafter to be described.

The implement is to be used for breaking new ground, tearing up roots, stumps, &c., and is so constructed that the hooks which dig up the ground can easily be withdrawn whenever the resistance shall become too great.

To enable others skilled in the art to make and use my invention, I will proceed to describe its construction and operation.

A frame consisting of a number of parallel bars, E, is hung to a shaft, F, supported upon two wheels or rollers, C. This shaft F serves also as a fulcrum for two hand-levers, D D, the purposes of which will hereinafter be explained:

Hooks A, provided with long shanks, are arranged one between each two of the bars E, and have the forward ends of their shanks firmly connected together by a bolt, G, which bolt secures also a ring, H, by means of which the implement may be hung to a common cart propelled by the animals of draft. Near the forward ends of the shanks of the hooks another bolt, I, passes through the shanks and through oblong slots J in the forward ends of the frame-bars E. The rear ends of the shanks, where the hooks commence, are also bolted together, as seen at K. The two outer hooks are pivoted to the short ends of the hand-levers D D at L L.

When the implement is at work the hooks are embedded in and digging up the ground, and the hand-levers are in an elevated position, as seen in Fig. 1. Whenever the obstructions become such that the animals cannot overcome the resistance the hooks can easily be withdrawn from the ground and lifted above it by the operator depressing the outer ends of the hand-levers, and thus raising the short ends of the levers, and with them the system of hooks pivoted to them. As the lever-arms which terminate in the handles are much longer than the short arms to which the hooks are pivoted, a very considerable leverage is obtained for the purpose of withdrawing the hooks from the ground. The slots J allow the bolt I, which connects the shanks of the hooks to the frame, the necessary play to compensate for the arc the rear ends of the hooks described on being raised by means of the hand-levers—an arc the center of which is the fulcrum of said levers.

By combining the parts above described I obtain a simple, durable, and highly effective implement well adapted to farming purposes.

What I claim as my invention, and desire to secure by Letters Patent, is—

The combination and relative arrangement of hooks A, slots B, rollers C, and hand-levers D, substantially as and for the purposes set forth.

JACOB B. ASH.

Witnesses:
GEO. R. HOWARD,
LEMUEL H. DURNELL.